(12) United States Patent
Hansen et al.

(10) Patent No.: US 8,401,942 B2
(45) Date of Patent: Mar. 19, 2013

(54) METHOD AND APPARATUS FOR DETERMINING A STANDARD NAME FOR A PAYEE

(75) Inventors: George A. Hansen, Danville, CA (US); Marko Rukonic, San Jose, CA (US); Benjamin R. Weiss, Portola Valley, CA (US); Jim Del Favero, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 463 days.

(21) Appl. No.: 12/044,470

(22) Filed: Mar. 7, 2008

(65) Prior Publication Data

US 2009/0228356 A1     Sep. 10, 2009

(51) Int. Cl.
*G06Q 40/00*     (2012.01)
(52) U.S. Cl. .......................................... 705/35
(58) Field of Classification Search ............... 705/35
See application file for complete search history.

(56) References Cited

U.S. PATENT DOCUMENTS

| | | | | |
|---|---|---|---|---|
| 2003/0172030 A1* | 9/2003 | Volgunin | ............ | 705/42 |
| 2005/0097048 A1* | 5/2005 | Hassanein et al. | ............ | 705/43 |
| 2009/0037461 A1* | 2/2009 | Rukonic et al. | ............ | 707/103 R |
| 2009/0150211 A1* | 6/2009 | Bayne | ............ | 705/10 |

OTHER PUBLICATIONS

Giovetti, Alfred C. Accounting software update : Account Technology 12. 2 (Feb./Mar. 1996):10.*
Conway, A Carr, Jr; Rouse ,Robert W. The Journal of Corporate & Finance; Wiley Periodicals Inc.; May/Jun. 2002.*
Gogan, Janis L; Gelinas, Ulric J, Jr. Journal of Information technology; Palgrave Macmillan; 22. 4 (Dec. 2007).*

* cited by examiner

*Primary Examiner* — Hani M Kazimi
*Assistant Examiner* — Hatem M Ali
(74) *Attorney, Agent, or Firm* — Park, Vaughan, Fleming & Dowler LLP (57) ABSTRACT

A system that determines a standard payee name for a payee is presented. During operation, the system receives a non-standard payee name, wherein the non-standard payee name can be a user-defined payee name, which is defined by a user, or a normalized payee name, which is defined by a financial institution. Next, the system determines whether the non-standard payee name is associated with the standard payee name by using the non-standard payee name to search through data structures containing associations between one or more of the following: user-defined payee names and normalized payee names; user-defined payee names and standard payee names; and normalized payee names and standard payee names. If the non-standard payee name is associated with a standard payee name, the system can perform specified actions.

24 Claims, 10 Drawing Sheets

```
public class ReversePayeeLookup
{
   public class PayeeListing
   {
      // Helper class containing Normalized payee (NP), User-defined payee (UDP)
      // and count details
   }
   // List of normalized payees encountered in recursion; recursion branch ends if
   // payee was "visited"
   private List<String> normPayees = null;

public ReversePayeeLookup()
   {
      normPayees = new ArrayList<String>(); // initialize list of normalized payees
   }
      // the function will work with either normalized or user-defined payee
   public PayeeListing findBestPayee(PayeeListing payeeListing)
   {
      // guard against bad input – no normalized payee and no user-defined payee
      if (payeeListing.empty())
      {
         return null;
      }
      PayeeListing payeeListing1 = new PayeeListing (payeeListing);
      if (payeeListing.getNp() != null)
      {
         payeeListing1 = _bestUDPMatchForNP(payeeListing.getNp());
         if (payeeListing1 == null)
            return null; // no match at all in database
         normPayees.add(payeeListing.getNp());
      }
      if (payeeListing1.empty())
         return payeeListing;

payeeListing = _bestNPMatchForUDP(payeeListing1.getUDP());
      if (payeeListing.empty())
         return payeeListing1;

if (normPayees.contains(payeeListing.getNp()))
         return payeeListing1;

return findBestPayee(payeeListing);
   }
```

FIG. 7A

```
private PayeeListing _bestUDPMatchForNP(String np)
{
    // Returns best user-defined payee name for a given normalized payee name
}
 private PayeeListing _bestNPMatchForUDP(String udp)
{
    // Returns best normalized payee name for a given user-defined payee name
}
}
```

FIG. 7B

METHOD AND APPARATUS FOR DETERMINING A STANDARD NAME FOR A PAYEE

BACKGROUND

Related Art

The present invention relates to techniques for determining a standard name for a payee.

Financial applications can help users keep track of their income and expenses. Unfortunately, users and financial institutions often identify payee names differently. For example, a user may refer to a payee as "Coffee Shop" whereas a financial institution may refer to the same payee as "CoffeeS2014." Furthermore, different users can refer to the same payee differently. These differences present problems when users attempt to aggregate data associated with the payees or when users attempt to analyze data associated with the payees.

SUMMARY

Some embodiments of the present invention provide a system that determines a standard name for a payee. In these embodiments, the system searches through a plurality of payee names to find a standard name for the payee. If a standard name for the payee is found, the system can perform specified actions. For example, the system can suggest products or services based on the standard payee name or the system can suggest that the standard payee name should be used to describe the payee instead of using the non-standard payee name.

Some embodiments of the present invention provide a system that aggregates related names for a payee. In these embodiments, the system groups related payee names and assigns scores to the groups of related payee names. The system then uses the groups and corresponding scores to determine a standard name for the payee.

BRIEF DESCRIPTION OF THE FIGURES

Table 1 presents examples of standard and non-standard payee names in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code, data structures, and/or data, which can be stored on a computer-readable storage medium as described above. When a computer system reads and executes the code and/or data stored on the computer-readable storage medium, the computer system performs the methods and processes embodied as code, data structures, and/or data that are stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Some embodiments of the present invention provide a technique for recursively searching for a standard payee name that corresponds to a non-standard payee name. These non-standard payee names can include "normalized payee names," which are defined by financial institutions, and "user-defined payee names," which are defined by users. Note that normalized payee names often include additional characters which are added by financial institutions. These characters can be removed to form the normalized payee names before the normalized payee names are used to perform the search for the standard payee name.

TABLE 1

Examples of standard and non-standard payee names.

| Standard Payee Name | Normalized Payee - Normalization logic applied to payee name | User-Defined Payee - User-defined payee name | Count |
|---|---|---|---|
| "Coffee Shop" | Coffee Shop | Coffee Shop | 10 |
|  | Coffee Shop | CShp | 7 |
|  | Coffee Shop | CoffeeS | 7 |
|  | CShop | Coffee Shop | 8 |
|  | CShop | CShp | 5 |
|  | CoffeeS | Coffee Shop | 2 |

To illustrate an exemplary technique, consider the example illustrated in Table 1. Table 1 includes a number of normalized payee names and user-defined payee names. Table 1 also includes the count (i.e., a score) for a given row (e.g., Normalized Payee/User-Defined Payee combination). In some embodiments, the count for a given normalized payee name and user-defined payee name combination can be calculated by counting the number of times that the given combination of normalized payee name and user-defined payee name has been encountered. In other embodiments, the count can be determined using one or more of: the number of times that a given combination of normalized payee name and user-defined payee name has been encountered, statistical analysis based on aggregate data about the normalized payee name and user-defined payee names, and manual analysis by a user. Consider a payee which has a payee name of "Coffee Shop." Financial institutions may refer to "Coffee Shop" as: "Coffee Shop," "CShop," and "CoffeeS." Similarly, users may refer to "Coffee Shop" as: "Coffee Shop," "CoffeeS," and "CShp."

A technique provided by embodiments of the present invention recursively searches for the standard payee name when given a normalized payee name or a user-defined payee name.

For example, if the user-defined payee name "CShp" is received, the system determines the normalized payee name associated with CShp. In doing so, the system can select the normalized payee name which has the greatest count for a given normalized payee name and user-defined payee name combination. In this example, the normalized payee name "Coffee Shop" with a count of 7 can be used. The system then searches for a user-defined payee name with associated with the normalized payee name "Coffee Shop." Again, the system can select the user-defined payee name with the greatest count. In this example, the user-defined payee name is also "Coffee Shop" and has a count of 10. At this point the system has found the standard payee name.

Similarly, if the normalized payee name "CoffeeS" is received, the system determines the user-defined payee name associated with "CoffeeS." In doing so, the system can select the user-defined payee name which has the greatest count for a given normalized payee name and user-defined payee name combination. In this example, the user-defined payee name is "Coffee Shop" which has a count of 2. The system then searches for a normalized payee name associated with the user-defined payee name "Coffee Shop." Again, the system can select the normalized payee name with the greatest count. In this example, the normalized payee name is also "Coffee Shop" and has a count of 10. At this point the system has found the standard payee name.

Computer System

Figure 1A:
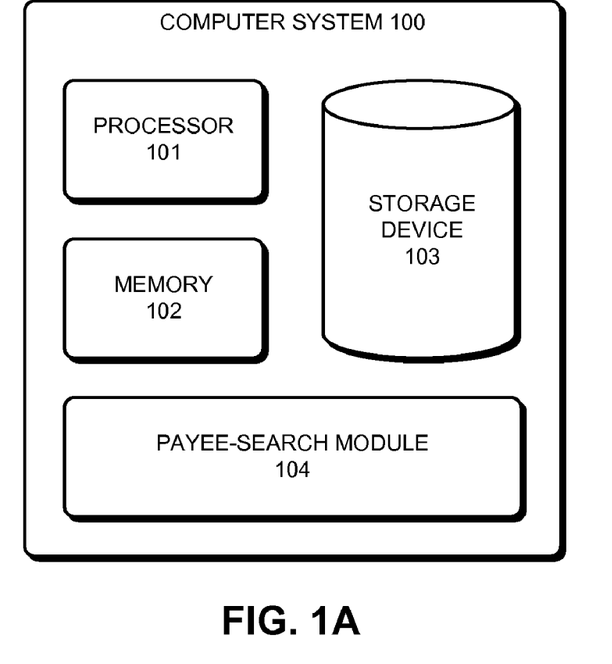
FIG. 1A presents a block diagram illustrating a computer system in accordance with embodiments of the present invention.

FIG. 1A presents a block diagram illustrating a computer system 100 in accordance with an embodiment of the present invention. Computer system 100 includes one or more of processor 101, memory 102, storage device 103, and payee-search module 104.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, read only memory (ROM), and any other type of memory now known or later developed. Storage device 103 can include any type of non-volatile storage device that can be coupled to a computer system. This includes, but is not limited to, magnetic, optical, and magneto-optical storage devices, as well as storage devices based on flash memory and/or battery-backed up memory.

In some embodiments of the present invention, payee-search module 104 is separate from computer system 100. Note that payee-search module 104 is described in more detail below with reference to FIG. 1B.

Figure 1B:
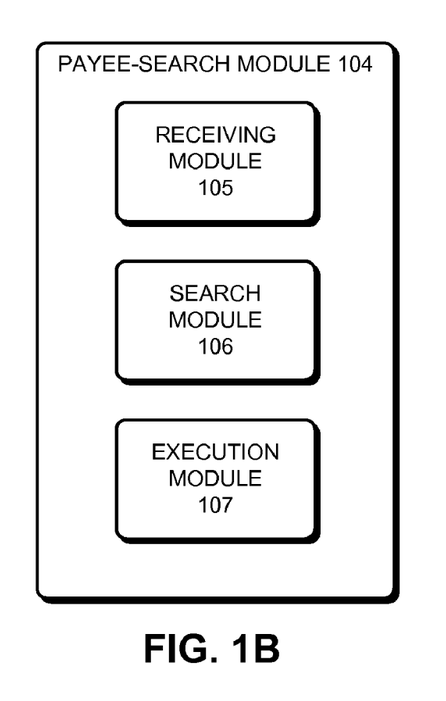
FIG. 1B presents a block diagram of a payee-search module in accordance with embodiments of the present invention.

FIG. 1B presents a block diagram of payee-search module 104 in accordance with an embodiment of the present invention. Payee-search module 104 includes one or more of receiving module 105, search module 106, and execution module 107. Receiving module 105 is configured to receive a non-standard payee name for the payee. Search module 106 is configured to use the non-standard payee name to search through a plurality of non-standard payee names which are associated with a standard payee name to determine whether the non-standard payee name is associated with the standard payee name. If search module 106 finds a non-standard payee name associated with the standard payee name, execution module 107 is configured to perform a specified action based on the standard payee name.

In some embodiments, one or more of receiving module 105, search module 106, and execution module 107 are included in one or more integrated circuit (IC) chips. For example, these IC chips can include, but are not limited to, application-specific integrated circuit (ASIC) chips, field-programmable gate arrays (FPGAs), and other programmable-logic devices now known or later developed.

Determining a Standard Payee Name for a Payee

Note that the discussion below generally refers to "a system," which can include, but is not limited to, a computer system, a server, a client computer system, a cluster of computer systems, a PDA, a mobile device, a component within a plurality of components, and a module within a software application.

Figure 2:
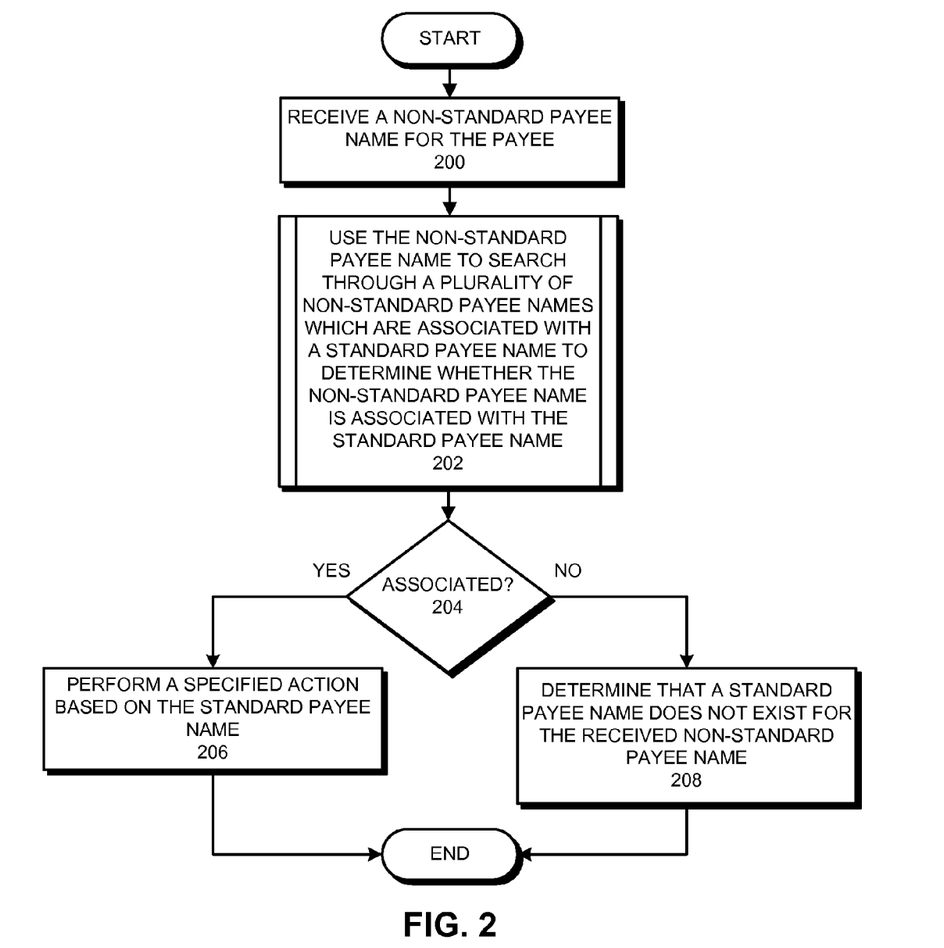
FIG. 2 presents a flow chart illustrating a process for determining a standard name for a payee in accordance with embodiments of the present invention.

FIG. 2 presents a flow chart illustrating a process for determining a standard name for a payee in accordance with embodiments of the present invention. The process begins when the system receives a non-standard name for the payee (step 200). In some embodiments, the non-standard name includes one or more of: a user-defined payee name which is defined by a user; and a normalized payee name which is defined by a financial institution.

Next, the system uses the non-standard payee name to search through a plurality of non-standard payee names which are associated with a standard payee name to determine whether the non-standard payee name is associated with the standard payee name (step 202). Note that step 202 is described in more detail with reference to FIGS. 3A-3B below. If the system determines that the non-standard payee name is associated with a standard payee name (step 204, yes), the system performs a specified action based on the standard payee name (step 206). In some embodiments, the specified action includes one or more of: providing a coupon based on the standard payee name; suggesting products based on the standard payee name; suggesting services based on the standard payee name; and suggesting that the user use the standard payee name instead of using the non-standard payee name while describing a transaction with the payee.

If the system determines that that the non-standard payee name is not associated with a standard payee name (step 204, no), the system determines that a standard payee name does not exist for the received non-standard payee name (step 208).

Figure 3A:
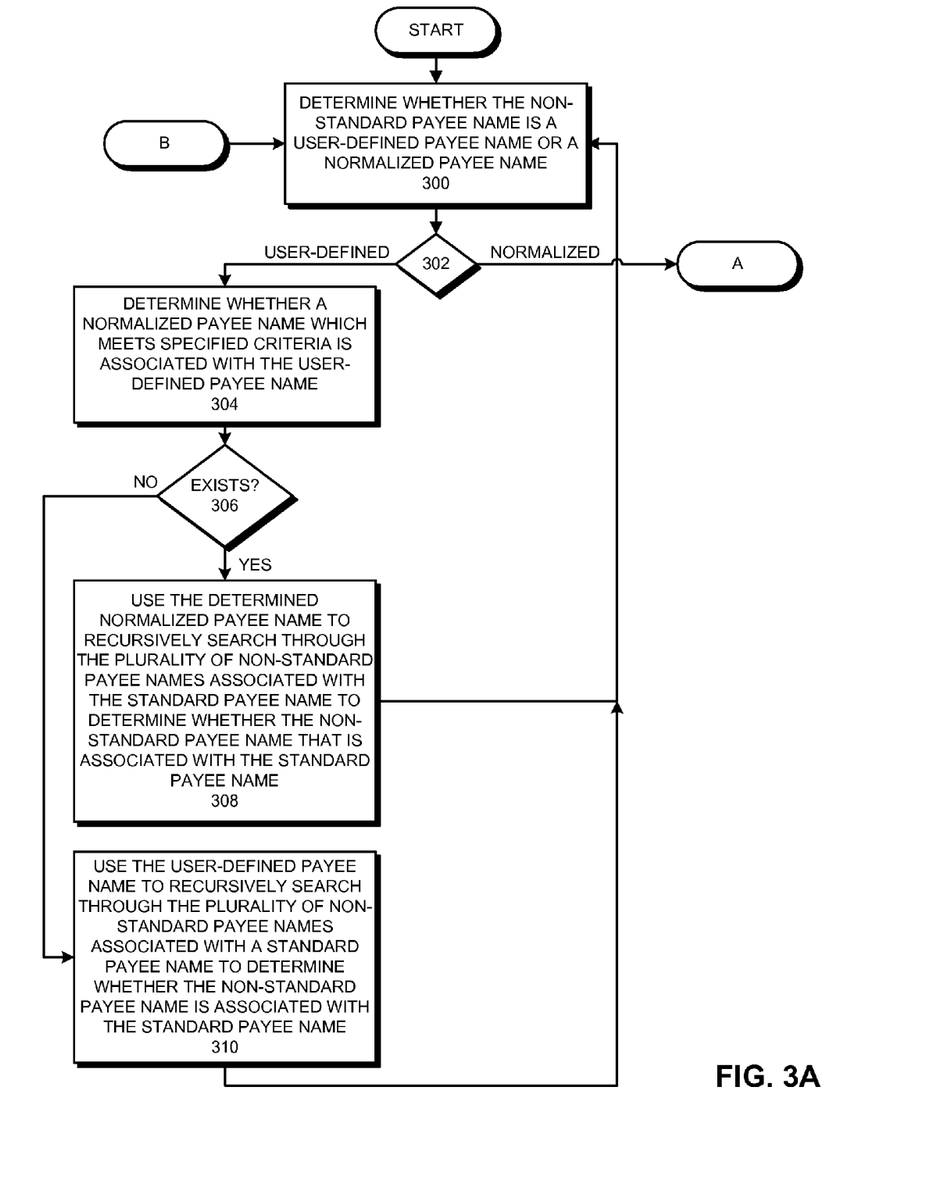
FIG. 3A presents a flow chart illustrating a process for recursively searching through a plurality of payee names to obtain a payee name that is associated with the standard payee name in accordance with embodiments of the present invention.
Figure 3B:
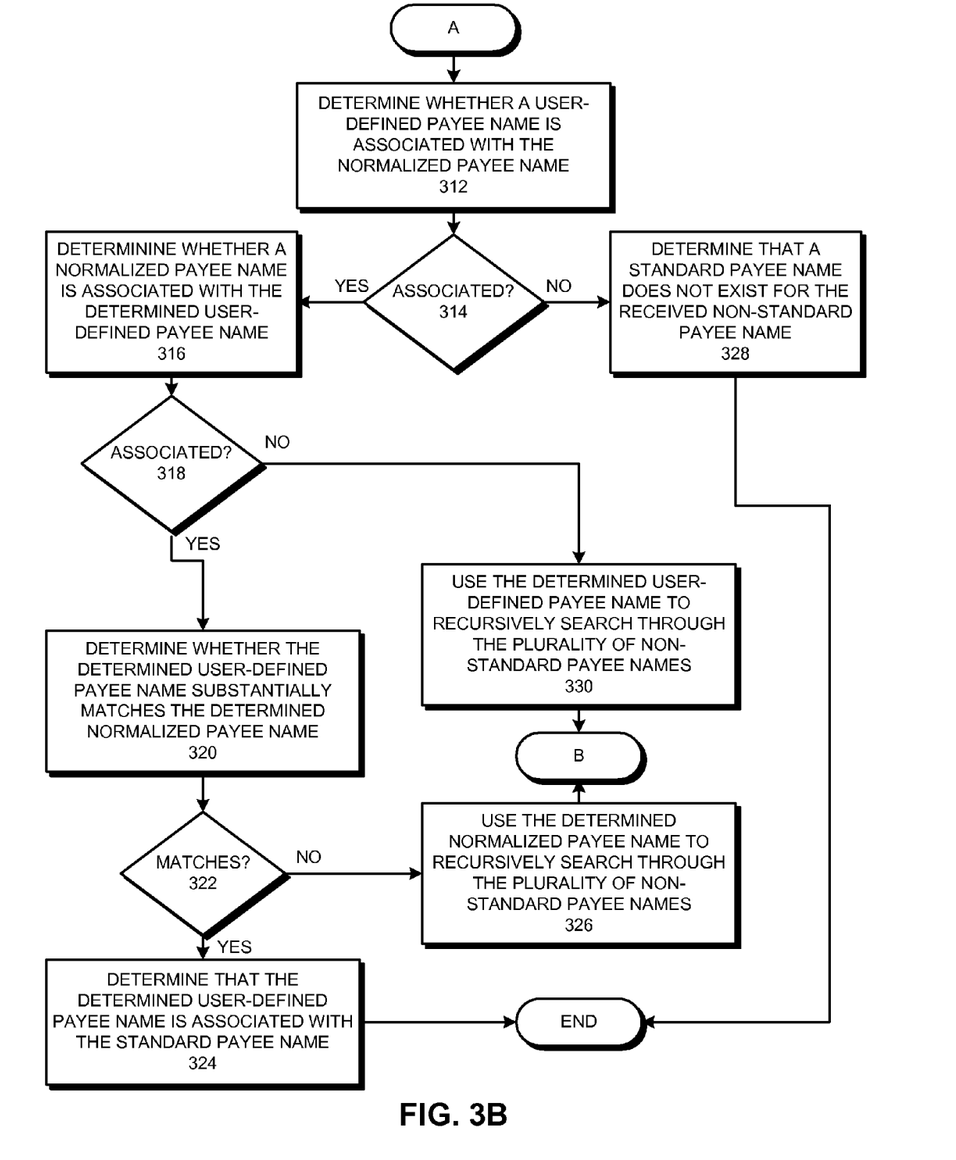
FIG. 3B continues the flow chart illustrated in FIG. 3A in accordance with embodiments of the present invention.

FIGS. 3A-3B present flow charts illustrating a process for recursively searching through a plurality of payee names to determine whether a non-standard payee name is associated with a standard payee name in accordance with embodiments of the present invention. The process begins when the system determines whether the non-standard payee name is a user-defined payee name or a normalized payee name (step 300). If the non-standard payee name is a user-defined payee name (step 302, user-defined payee name), the system determines whether an associated normalized payee name which meets specified criteria is associated with the user-defined payee name (step 304). If so (step 306, yes), the system uses the determined normalized payee name to recursively search through the plurality of non-standard payee names to determine whether the non-standard payee name that is associated with the standard payee name (step 308). The system then returns to step 300.

If a normalized payee name which meets the specified criteria is not associated with the user-defined payee name (step 306, no), the system uses the user-defined payee name to recursively search through the plurality of non-standard payee names associated with a standard payee name to determine whether the non-standard payee name is associated with the standard payee name (step 310). The system then returns to step 300.

Returning to step 302, if the non-standard payee name is a normalized payee name (step 302, normalized payee name), the system determines whether a user-defined payee name which meets specified criteria is associated with the normalized payee name (step 312). If so (step 314, yes), the system determines whether a normalized payee name which meets specified criteria is associated with the determined user-defined payee name (step 316). If so (step 318, yes), the system determines whether the determined user-defined payee name substantially matches the determined normalized payee name (step 320). If so (step 322, yes), the system determines that the determined user-defined payee name is associated with the standard payee name (step 324). Otherwise (step 322, no), the system uses the determined normalized payee name to recursively search through the plurality of non-standard payee names which are associated with a standard payee name to determine whether the non-standard payee name is associated with the standard payee name (step 326). The system then returns to step 300.

Returning to step 318, if a normalized payee name which meets the specified criteria is not associated with the determined user-defined payee name (step 318, no), the system uses the determined user-defined payee name to recursively search through the plurality of non-standard payee names which are associated with a standard payee name to determine whether the non-standard payee name is associated with the standard payee name (step 330). The system then returns to step 300.

Returning to step 314, if a user-defined payee name which meets the specified criteria is not associated with the normalized payee name (step 314, no), the system determines that a standard payee name does not exist for the received non-standard payee name (step 328).

In some embodiments, the specified criteria includes one or more of: a score for a given normalized payee name which is the maximum score for all normalized payee names that are associated with a given user-defined payee name; and a score for a given user-defined payee name which is the maximum score for all user-defined payee names that are associated with a given normalized payee name.

Aggregating Non-Standard Payee Names for a Payee

Figure 4:
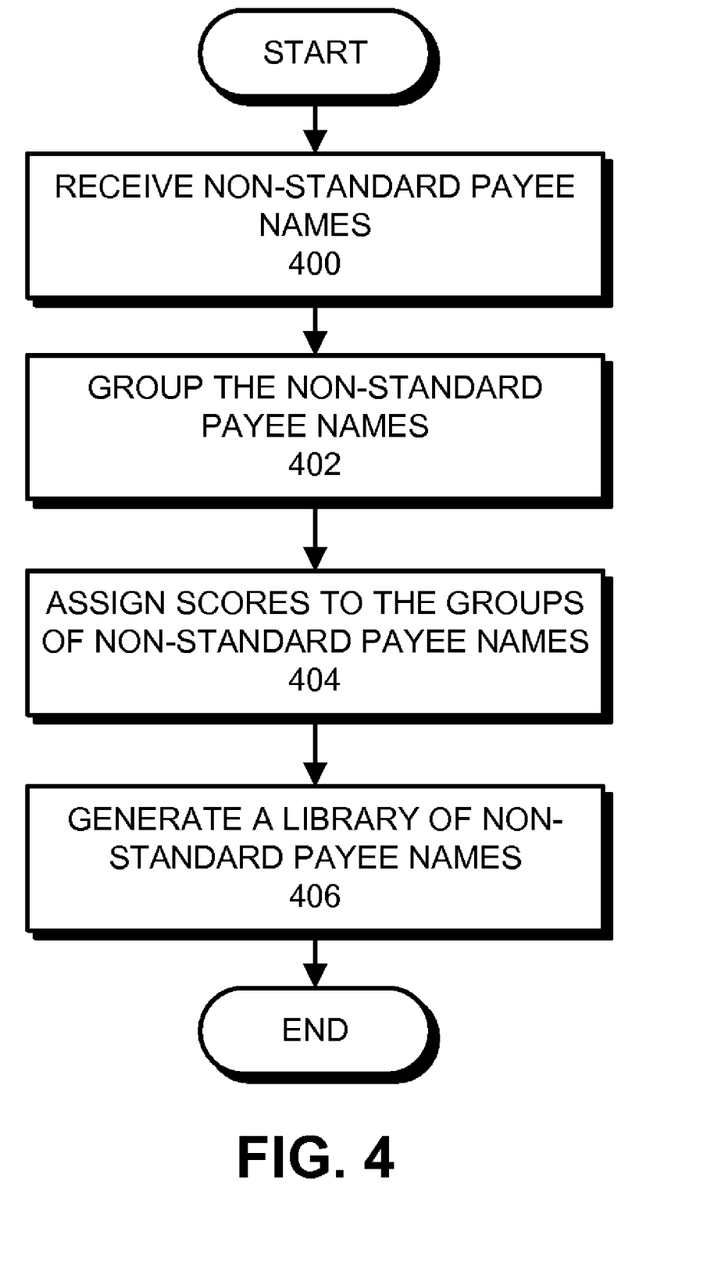
FIG. 4 presents a flow chart illustrating a process for aggregating related payee names for a payee in accordance with embodiments of the present invention.

FIG. 4 presents a flow chart illustrating a process for aggregating non-standard payee names for a payee in accordance with embodiments of the present invention. The process begins when the system receives a set of non-standard payee names (step 400). The system then groups the non-standard payee names (step 402). For example, in some embodiments, while grouping the non-standard payee names, the system groups normalized payee names that are associated with the same user-defined payee names into a single group of non-standard payee names. Next, the system assigns scores to the groups of non-standard payee names (step 404). For example, in some embodiments, while assigning a score to a given group of non-standard payee names, the system assigns a score with a value equal to the number of non-standard payee names in the given group of non-standard payee names. Note that the scores (e.g., counts) can also be determined as described with reference to Table 1.

The system then generates a library of non-standard payee names (step 406) which includes the scores for the groups of non-standard payee names, wherein the library is used to determine a standard payee name for the payee.

Exemplary Implementation

Figure 5:
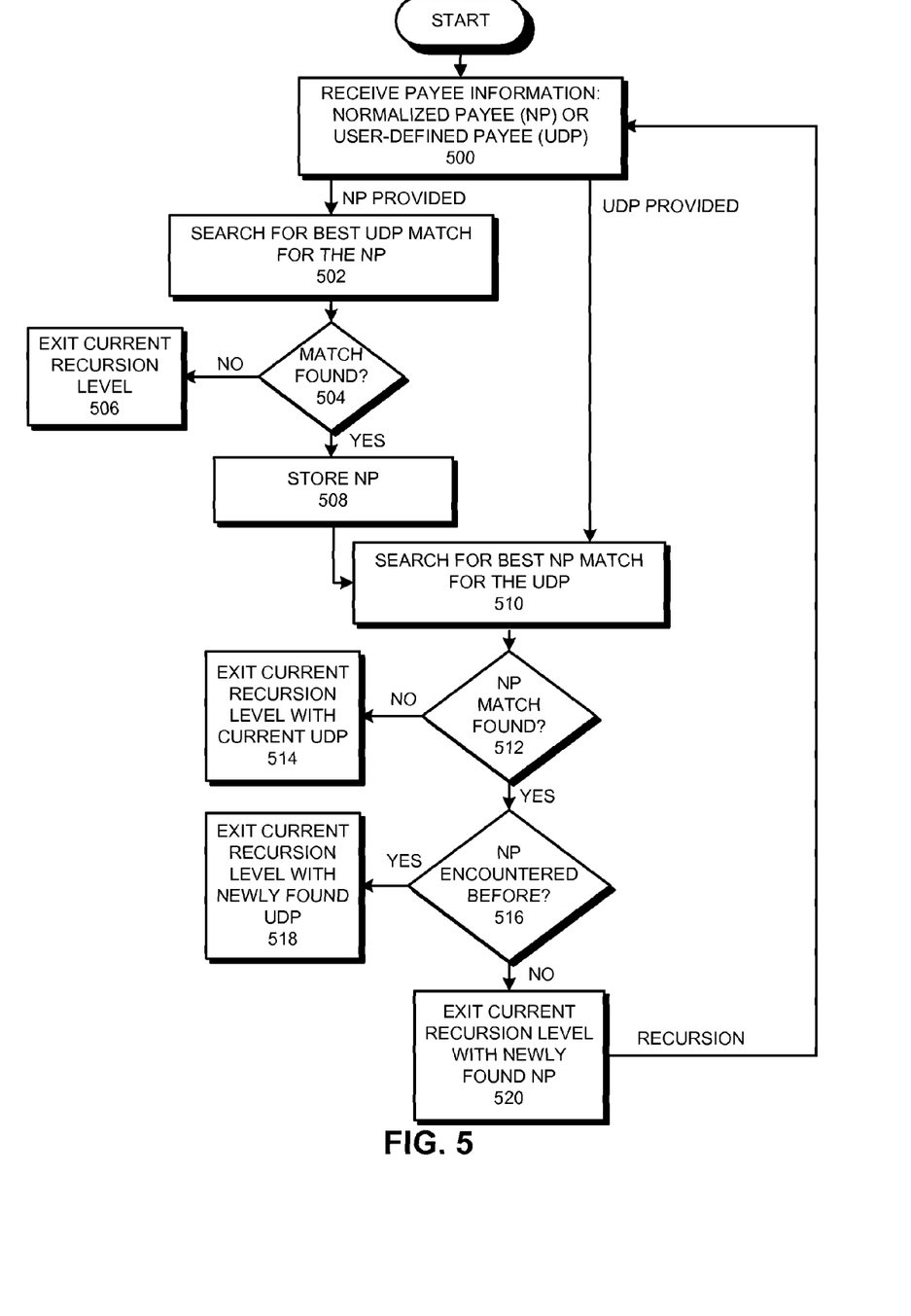
FIG. 5 presents a flow chart illustrating an exemplary process for determining a payee name for a payee in accordance with embodiments of the present invention.

FIG. 5 presents a flow chart illustrating an exemplary process for determining a standard payee name for a payee in accordance with embodiments of the present invention. The process begins when the system receives payee information, which can include a normalized payee name (NP) or a user-defined payee name (UDP) (step 500).

If an NP is provided, the system searches for the best UDP for the NP (step 502). For example, the system can search a database of payees. If no match is found (step 504, no), the system exits the current recursion level (step 506). Note that this case occurs when a payee has not been encountered before. If a match is found (step 504, yes), the system stores the NP (step 508). For example, the system can store the NP in a database of payees.

After step 508 or if a UDP is provided in step 500, the system searches for the best NP which matches the UDP (step 510). If a matching NP is not found (step 512, no), the system exits the current recursion level with the UDP used in the current recursion level (step 514). On the other hand, if an NP match is found (step 512, yes), the system determines whether the NP has been encountered before. If the NP has been encountered before (step 516, yes), the system exits the current recursion level with the newly-found UDP (step 518). Note that in step 518, the standard payee name is the newly-found UDP.

On the other hand, if the NP has not been encountered before (step 516, no), the system exits the current recursion level with the newly found NP (step 520). The system then returns to step 500 (i.e., recursively searches for the standard payee name).

Figure 6A:
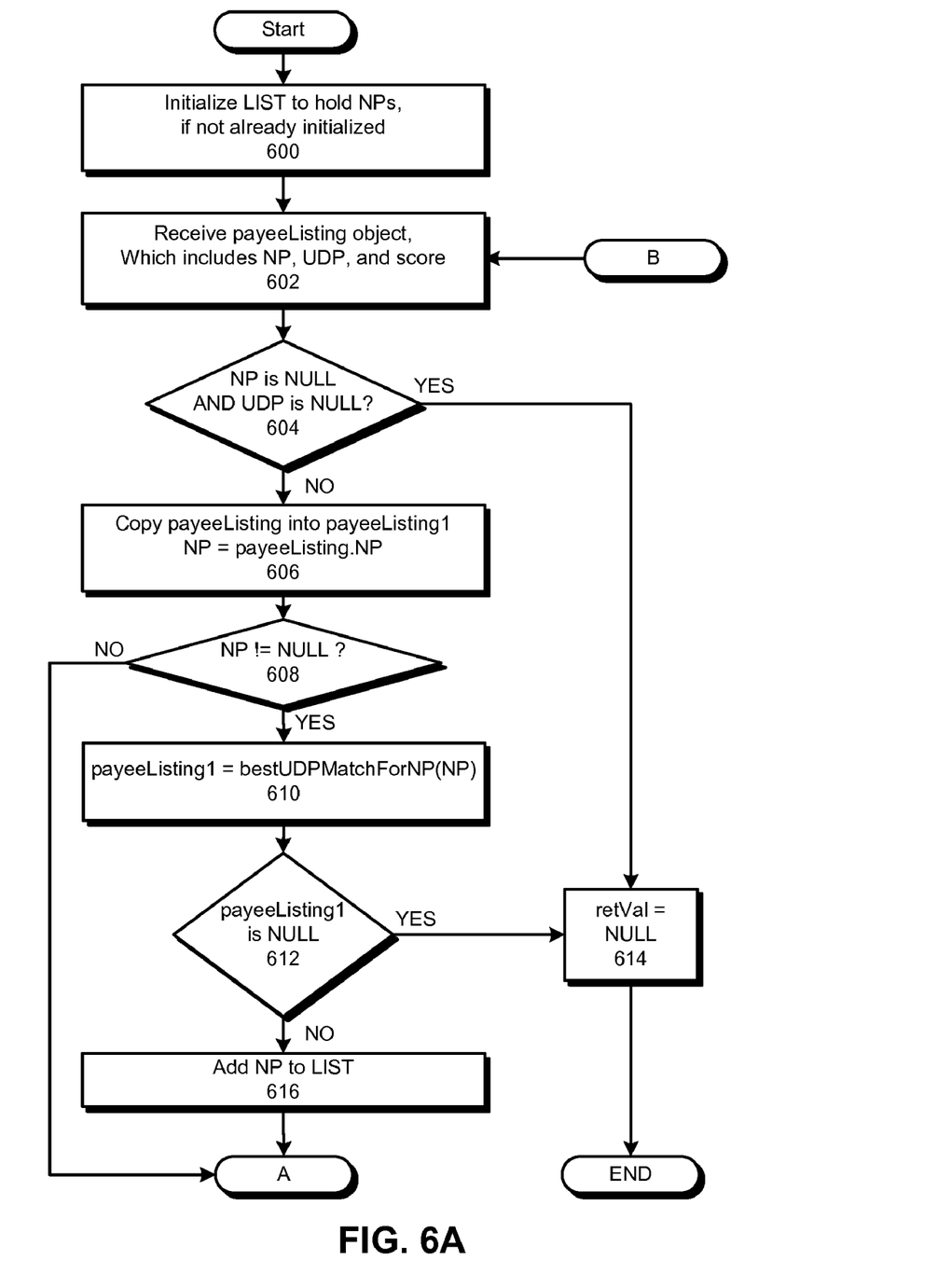
FIG. 6A presents a flow chart illustrating another exemplary process for determining a payee name for a payee in accordance with embodiments of the present invention.
Figure 6B:
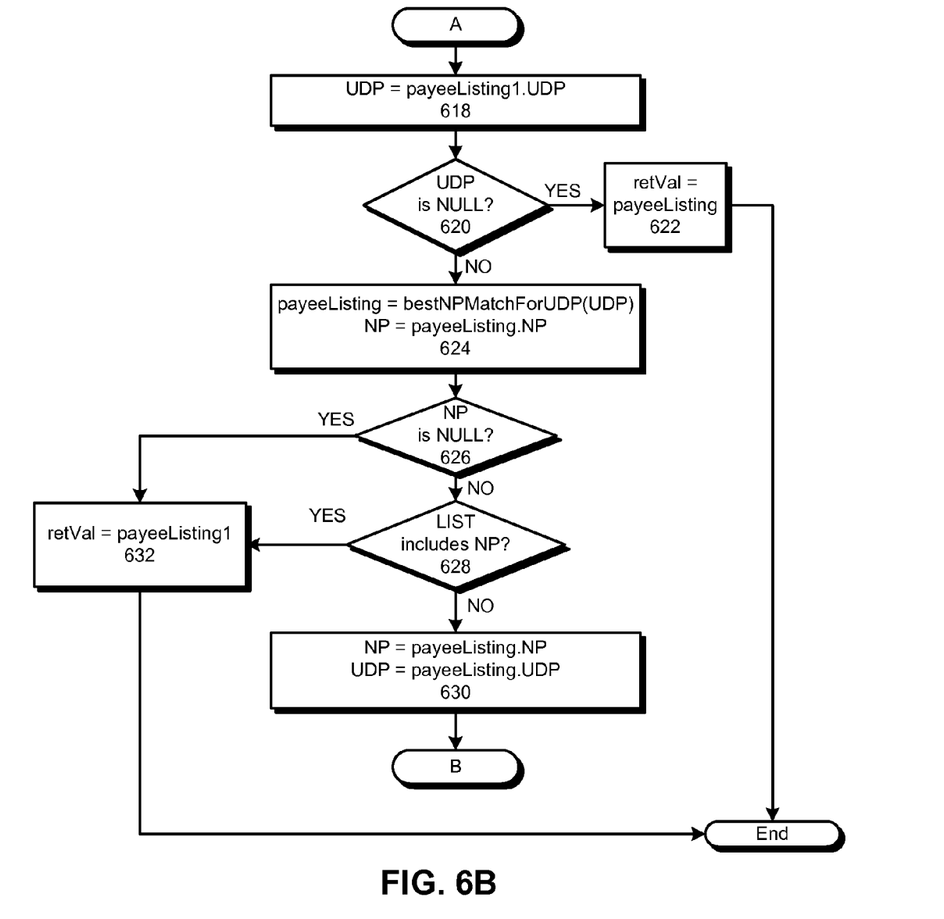
FIG. 6B continues the exemplary process presented in FIG. 6A in accordance with embodiments of the present invention.

FIGS. 6A-6B present flow charts illustrating another exemplary process for determining a standard payee name for a payee in accordance with embodiments of the present invention. The process begins when the system initializes a LIST to hold NPs, if the LIST has not already been initialized (step 600). Next, the system receives a payeeListing object which includes one or more of an NP, a UDP, and a score (step 602). If the NP is NULL and the UDP is NULL (step 604, yes), the system sets retVal=NULL (step 614). Note that if step 614 is reached, the payee does not exist in the database. If NP is not NULL or UDP is not NULL (step 604, no), the system copies payeeListing into payeeListing1 and sets the variable NP=payeeListing.NP (step 606).

If NP is not NULL (step 608, yes), the system sets payeeListing1=bestUDPMatchForNP(NP) (step 610). Note that bestUDPMatchForNP(NP) is a function which searches for the best UDP for a given NP. If payeeListing1 is NULL (step 612, yes), the system sets retVal=NULL (step 614). If payeeListing1 is not NULL (step 612, no), the system adds NP to LIST (step 616).

After step 616 or if the system determines that NP is NULL (step 608, no), the system sets the variable UDP=payeeListing1.UDP (step 618). If UDP is NULL (step 620, yes), the system sets retVal=payeeListing (step 622). Otherwise (step 620, no), the system sets payeeListing=bestNPMatchForUDP(UDP) and sets the variable NP=payeeListing.NP (step 624). Note that bestNPMatchForUDP(UDP) is a function which searches for the best NP for a given UDP.

If NP is NULL (step 626, yes) or if NP is not NULL (step 626, no) and LIST includes NP (step 628, yes), the system sets retVal=payeeListing1 (step 632). If NP is not NULL (step 626, no) and LIST does not include NP (step 628, no), the system sets NP=payeeListing.NP and UDP=payeeListing.UDP (step 630). The system then returns to step 602 (i.e., recursion).

Figure 7A:
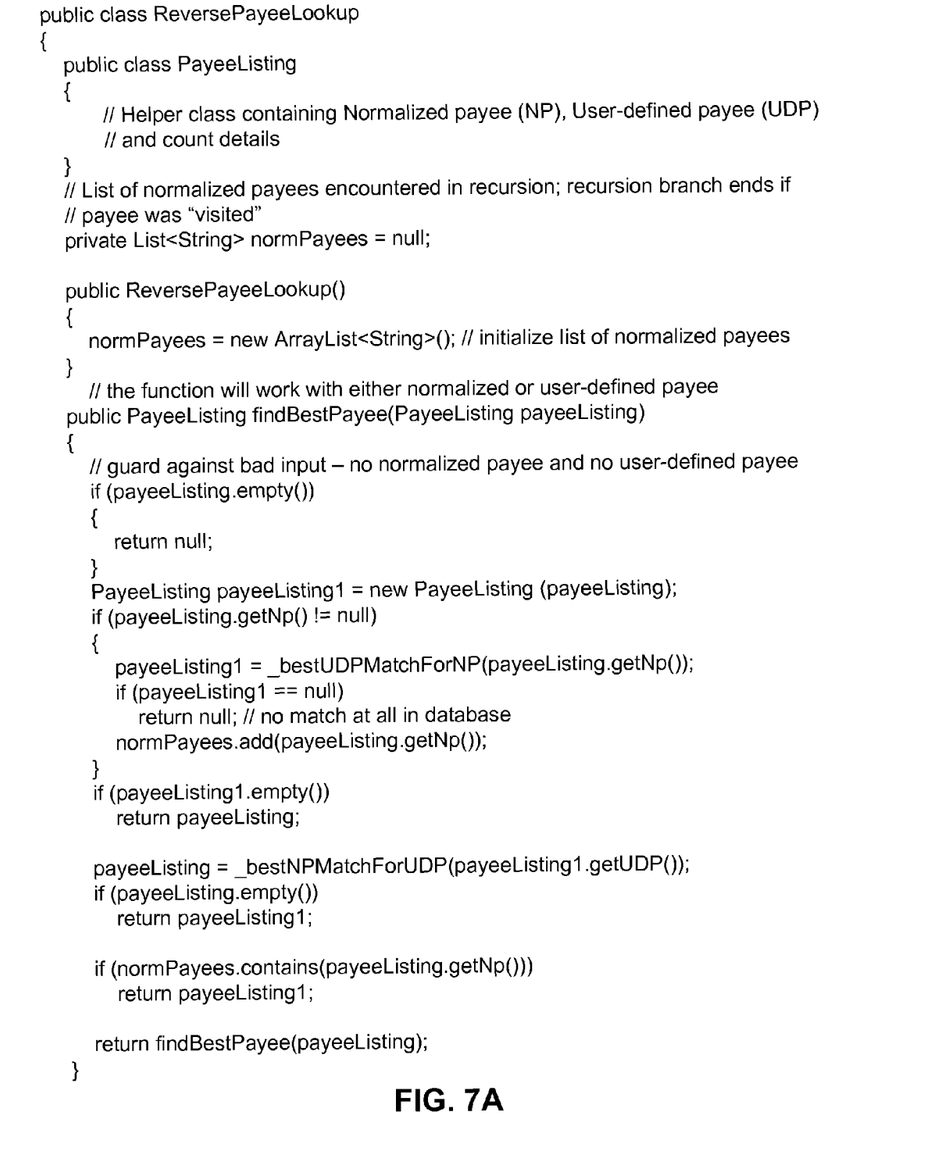
FIG. 7A presents exemplary computer code which determines a standard name for a payee in accordance with embodiments of the present invention.
Figure 7B:
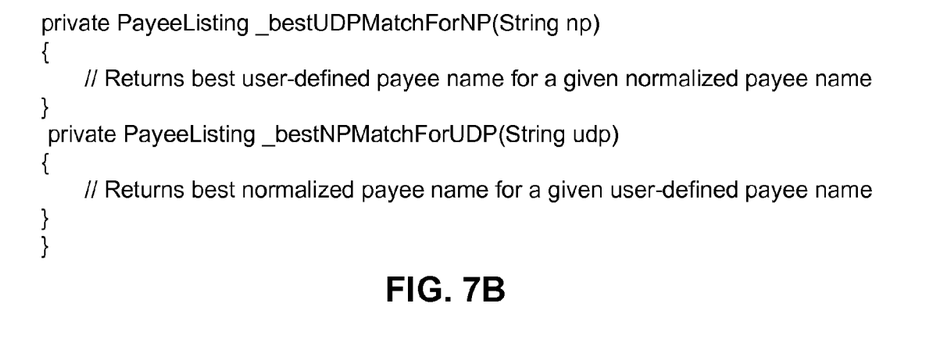
FIG. 7B continues the exemplary computer code presented in FIG. 7A in accordance with embodiments of the present invention.

FIGS. 7A-7B present exemplary computer code which determines a standard payee name for a payee in accordance with embodiments of the present invention.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a standard payee name for a payee, comprising:
  receiving a non-standard payee name for the payee, wherein the non-standard payee name is a user-defined payee name or a normalized payee name which is defined by a financial institution;
  determining whether the non-standard payee name is a user-defined payee name or a normalized payee name;
  determining, by computer, whether the non-standard payee name is associated with a standard payee name that is associated with a plurality of non-standard payee names, which involves searching, based on whether the non-standard payee name is a user-defined payee name or a normalized payee name, for the received non-standard payee name in a payee data store that comprises associations between the non-standard payee names and the standard payee name; and
  responsive to the non-standard payee name being associated with the standard payee name, performing a specified action based on the standard payee name.

2. The method of claim 1, wherein searching for the non-standard payee name in the payee data store involves:
  determining a combination of a user-defined payee name and a normalized payee name with the highest occurrence in the payee data store, wherein one payee name in the combination is the non-standard payee name; and
  recursively searching the payee data store with both the user-defined payee name and the normalized payee name from the combination with the highest occurrence in the payee data store.

3. The method of claim 2, wherein searching for the non-standard payee name in the payee data store involves:
  responsive to the non-standard payee name being a user-defined payee name, determining whether a normalized payee name which meets specified criteria is associated with the user-defined payee name; and
  responsive to the normalized payee name being associated with the user-defined payee name, using the determined normalized payee name to recursively search through the plurality of non-standard payee names associated with the standard payee name to determine whether the non-standard payee name that is associated with the standard payee name.

4. The method of claim 3, wherein responsive to a normalized payee name which meets the specified criteria not associated with the user-defined payee name, the method further comprises using the user-defined payee name to recursively search through the plurality of non-standard payee names associated with a standard payee name to determine whether the non-standard payee name is associated with the standard payee name.

5. The method of claim 3, wherein responsive to the non-standard payee name being a normalized payee name, the method further comprises:
  determining whether a user-defined payee name which meets specified criteria is associated with the normalized payee name;
  responsive to the user-defined payee name being associated with the normalized payee name, determining whether a normalized payee name which meets specified criteria is associated with the determined user-defined payee name;
  responsive to the normalized payee name that meets specified criteria being associated with the determined user-defined payee name, determining whether the determined user-defined payee name substantially matches the determined normalized payee name;
  if so, determining that the determined user-defined payee name is associated with the standard payee name; and
  otherwise, using the determined normalized payee name to recursively search through the plurality of non-standard payee names which are associated with the standard payee name to determine whether the non-standard payee name is associated with the standard payee name.

6. The method of claim 5, wherein the specified criteria includes one or more of:
  a score for a given normalized payee name which is the maximum score for all normalized payee names that are associated with a given user-defined payee name; and
  a score for a given user-defined payee name which is the maximum score for all user-defined payee names that are associated with a given normalized payee name.

7. The method of claim 5, wherein responsive to a user-defined payee name which meets the specified criteria not being associated with the normalized payee name, the method further comprises determining that a standard payee name does not exist for the received non-standard payee name.

8. The method of claim 5, wherein responsive to a normalized payee name which meets the specified criteria not being associated with the determined user-defined payee name, the method further comprises using the determined user-defined payee name to recursively search through the plurality of non-standard payee names which are associated with a standard payee name to determine whether the non-standard payee name is associated with the standard payee name.

9. The method of claim 1, wherein the specified action includes one or more of:
   providing a coupon based on the standard payee name;
   suggesting products based on the standard payee name;
   suggesting services based on the standard payee name; and
   suggesting that the user use the standard payee name instead of using the non-standard payee name to describe a transaction with the payee.

10. The method of claim 1, wherein responsive to a non-standard payee name that is associated with the standard payee name not being associated with the standard payee name, the method further comprises determining that a standard payee name does not exist for the received non-standard payee name.

11. A non-transitory computer-readable storage medium storing instructions that when executed by a computer cause the computer to perform a method for determining a standard payee name for a payee, wherein the method comprises:
   receiving a non-standard payee name for the payee, wherein the non-standard payee name is a user-defined payee name or a normalized payee name which is defined by a financial institution;
   determining whether the non-standard payee name is a user-defined payee name or a normalized payee name;
   determining whether the non-standard payee name is associated with the standard payee name that is associated with a plurality of non-standard payee names, which involves searching, based on whether the non-standard payee name is a user-defined payee name or a normalized payee name, for the received non-standard payee name in a payee data store that comprises associations between the non-standard payee names and the standard payee name; and
   responsive to the non-standard payee name being associated with the standard payee name, performing a specified action based on the standard payee name.

12. The non-transitory computer-readable storage medium of claim 11, wherein searching for the non-standard payee name in the payee data store involves:
   determining whether the non-standard payee name is a user-defined payee name or a normalized payee name;
   determining a combination of a user-defined payee name and a normalized payee name with the highest occurrence in the payee data store, wherein one payee name in the combination is the non-standard payee name; and
   recursively searching the payee data store with both the user-defined payee name and the normalized payee name from the combination with the highest occurrence in the payee data store.

13. The non-transitory computer-readable storage medium of claim 12, wherein searching for the non-standard payee name in the payee data store involves:
   responsive to the non-standard payee name being a user-defined payee name, determining whether a normalized payee name which meets specified criteria is associated with the user-defined payee name; and
   responsive to the normalized payee name being associated with the user-defined payee name, using the determined normalized payee name to recursively search through the plurality of non-standard payee names associated with the standard payee name to determine whether the non-standard payee name that is associated with the standard payee name.

14. The non-transitory computer-readable storage medium of claim 13, wherein responsive to a normalized payee name which meets the specified criteria does not exist, the method further comprises using the user-defined payee name to recursively search through the plurality of non-standard payee names associated with a standard payee name to determine whether the non-standard payee name is associated with the standard payee name.

15. The non-transitory computer-readable storage medium of claim 13, wherein responsive to the non-standard payee name being a normalized payee name, the method further comprises:
   determining whether a user-defined payee name which meets specified criteria is associated with the normalized payee name;
   responsive to the user-defined payee name being associated with the normalized payee name, determining whether a normalized payee name which meets specified criteria is associated with the determined user-defined payee name;
   responsive to the normalized payee name that meets specified criteria being associated with the determined user-defined payee name, determining whether the determined user-defined payee name substantially matches the determined normalized payee name; and
   if so, determining that the determined user-defined payee name is associated with the standard payee name; and
   otherwise, using the determined normalized payee name to recursively search through the plurality of non-standard payee names which are associated with the standard payee name to determine whether the non-standard payee name is associated with the standard payee name.

16. The non-transitory computer-readable storage medium of claim 15, wherein the specified criteria includes one or more of:
   a score for a given normalized payee name which is the maximum score for all normalized payee names that are associated with a given user-defined payee name; and
   a score for a given user-defined payee name which is the maximum score for all user-defined payee names that are associated with a given normalized payee name.

17. The non-transitory computer-readable storage medium of claim 15, wherein responsive to a user-defined payee name which meets the specified criteria not being associated with the normalized payee name, the method further comprises determining that a standard payee name does not exist for the received non-standard payee name.

18. The non-transitory computer-readable storage medium of claim 15, wherein responsive to a normalized payee name which meets the specified criteria not being associated with the determined user-defined payee name, the method further comprises using the determined user-defined payee name to recursively search through the plurality of non-standard payee names which are associated with a standard payee name to determine whether the non-standard payee name is associated with the standard payee name.

19. The non-transitory computer-readable storage medium of claim 11, wherein the specified action includes one or more of:
   providing a coupon based on the standard payee name;
   suggesting products based on the standard payee name;
   suggesting services based on the standard payee name; and
   suggesting that the user use the standard payee name instead of using the non-standard payee name to describe a transaction with the payee.

20. The non-transitory computer-readable storage medium of claim 11, wherein responsive to a non-standard payee name that not being associated with the standard payee name, the method further comprises determining that a standard payee name does not exist for the received non-standard payee name.

21. An apparatus that determines a standard payee name for a payee, comprising:
   a processor;
   a receiving mechanism configured to receive a non-standard payee name for the payee, wherein the non-standard payee name is a user-defined payee name or a normalized payee name which is defined by a financial institution;
   a determination mechanism configured to determine whether the non-standard payee name is the user-defined payee name or the normalized payee name
   a search mechanism configured to determine whether the non-standard payee name is associated with the standard payee name that is associated with a plurality of non-standard payee names, which involves searching, based on whether the non-standard payee name is a user-defined payee name or a normalized payee name, for the received non-standard payee name in a payee data store that comprises associations between the non-standard payee names and the standard payee name; and
   an execution mechanism, wherein responsive to a non-standard payee name being associated with the standard payee name, the execution mechanism is configured to perform a specified action based on the standard payee name.

22. A method for aggregating non-standard payee names for a payee, comprising:
   receiving non-standard payee names comprising both user-defined payee names and normalized payee names;
   grouping the non-standard payee names based on one or more of: associations between user-defined payee names and normalized payee names and associations between non-standard payee names and standard payee names;
   assigning, by computer, scores to the groups of non-standard payee names, wherein assigning a score to a given group of non-standard payee names involves assigning a score with a value equal to the number of non-standard payee names in the given group of non-standard payee names; and
   generating a library of non-standard payee names which includes the scores for the groups of non-standard payee names, wherein the library is used to determine a standard payee name for the payee.

23. The method of claim 22, wherein a non-standard payee name includes one or more of:
   a user-defined payee name which is defined by users; and
   a normalized payee name which is defined by financial institutions.

24. The method of claim 23, wherein grouping the non-standard payee names involves grouping normalized payee names that are associated with the same user-defined payee names into a single group of non-standard payee names.

* * * * *